United States Patent [19]

Miyabayashi et al.

[11] Patent Number: 4,861,672
[45] Date of Patent: Aug. 29, 1989

[54] ONE-CAN HEAT-CURABLE RESIN COMPOSITIONS AND PRECOATED METAL

[75] Inventors: Shigeaki Miyabayashi, Kobe; Hiroshi Kanai, Kimitsu; Joji Oka, Tokyo; Yoshikatsu Matsuura, Minoo, all of Japan

[73] Assignees: Takeda Chemical Industries, Ltd., Osaka; Nippon Steel Corporation, Tokyo, both of Japan

[21] Appl. No.: 218,298

[22] Filed: Jul. 13, 1988

[30] Foreign Application Priority Data

Jul. 14, 1987 [JP] Japan ................... 62-175761

[51] Int. Cl.$^4$ ............. B32B 15/08; C08G 18/81
[52] U.S. Cl. .................. 428/458; 428/425.8; 428/480; 528/45
[58] Field of Search ........ 428/458, 480, 425.8, 428/457; 528/45

[56] References Cited

U.S. PATENT DOCUMENTS 4,507,412 . 3/1985 Hickner et al. .............. 528/45 X
4,791,168 12/1988 Salatin et al. ............... 428/458 X
4,808,477 2/1989 Harber .................... 428/458 X Primary Examiner—Thomas J. Herbert
Attorney, Agent, or Firm—Wenderoth, Lind & Ponack

[57] ABSTRACT

A one-can heat-curable resin composition which comprises: (1) a polyester polyol having at least three functional groups; (2) an adduct of an epoxy resin having at least one secondary hydroxyl group with a lactone compound or an alkylene oxide; and (3) a blocked organic polyisocyanate or a product of blocking of a prepolymer having terminal NCO groups obtained by reacting an organic polyisocyanate and an active hydrogen-containing compound, gives a tough and durable coat film showing no yellowing or thermal degradation due to heating at all.

Furthermore, said film has a high hardness and is excellent in processability and staining resistance, particularly in mustard staining resistance. In particular, the composition, when used in the production of precoated metal, gives good coated steel sheets, which can be advantageously used in manufacturing household electric appliances and so on.

5 Claims, No Drawings

ONE-CAN HEAT-CURABLE RESIN COMPOSITIONS AND PRECOATED METAL

This invention relates to a one-can heat-curable resin composition with which coatings having good film properties, in particular capable of withstanding such processing as bending, can be obtained. The resin composition according to the invention is particularly useful as a coating composition for steel sheets in manufacturing precoated metal, among others.

Precoated metal is generally manufactured by coating galvanized sheets or other metal sheets with a coating composition, then fabricated into some or other desired shape and submitted to an end use. For instance, it is used in manufacturing household electric appliances, such as refrigerators, washers and heaters, fixtures, such as automatic vendors, office machines and food display cases, and the like metal products. Such precoated metal is expected to be used more widely in the future since it is more advantageous, with respect to coating process rationalization, uniformity in quality and saving in coating material consumption, among others, than coated metal sheet products manufactured by the so-called postcoating process comprising fabricating metal sheets into complicated shapes and then applying a coating composition to the shaped matters.

The coating composition to be applied to metal sheets for precoating is required to hold sufficient extensibility and adhesion to the metal surface so that the coat film can endure fabrication processes, such as bending, folding, rolling, embossing and drawing, since precoated metal is fabricated into shapes suited for the uses mentioned above after formation of the coat film. On the other hand, the final products obtained by using the precoated metal are required to have performance characteristics adapted for their respective end uses. For instance, building exterior materials, in particular fabricated portions thereof, are required to have high-level weather resistance and corrosion resistance. In the case of refrigerators and other household electric appliances, scuffing resistance and staining resistance are required. In addition, luster, water resistance, chemical resistance, moisture resistance and other durability characteristics are required, as the case may be.

For the above-mentioned uses, for example in household electric appliance manufacture, amino-alkyd resins, melamine-cured polyol acrylates and epoxy resins have been used. However, these resins have the drawback that the coat films obtained from said resins are poor in bendability or foldability, hence cracking may occur when they are bent to an angle of 90° or more.

A method of producing precoated metal which comprises applying a composition containing bis-(isocyanatomethyl)cyclohexane or an adduct thereof, in a blocked form, and a polyol resin to metal sheets and curing the composition by heating is known (Japanese Kokai Tokkyo Koho JP No. 56-89548). However, precoated metal obtained by this method cannot meet all the physical property requirements such as mentioned above.

Another known method (Japanese Kokai Tokkyo Koho JP No. 57-10375) comprises applying a composition containing an ethylenimine-blocked isocyanate compound and a polyol resin to metal sheets and curing the composition by heating. However, precoated metal obtained by this method cannot meet all the physical property requirements such as mentioned above, either.

It is a very difficult problem to improve film properties while balancing the bendability or foldability, staining resistance and hardness with one another. An object of the invention is to provide a resin composition capable of giving coat films which are well balanced among bendability or foldability, staining resistance and hardness and have good film properties.

As a result of their intensive investigations made in an attempt to find a resin composition giving coat films with good performance characteristics, the present inventors found that combined use, as the polyol component, of a polyester polyol having at least three functional groups and an adduct of an epoxy resin having at least one secondary hydroxyl group with a lactone compound or an alkylene oxide leads to formation of coat films having good bendability or foldability, high hardness, and good staining resistance, in particular good marking ink staining resistance and mustard staining resistance. Based on this finding, they have now completed this invention.

Thus this invention is concerned with:

1. A one-can heat-curable resin composition which comprises: (1) a polyester polyol having at least three functional groups; (2) an adduct of an epoxy resin having at least one secondary hydroxyl group with a lactone compound or an alkylene oxide; and (3) a blocked organic polyisocyanate or a product of blocking of a prepolymer having terminal NCO groups obtained by reacting an organic polyisocyanate and an active hydrogen-containing compound; and 2. A precoated metal obtained by coating metal sheet with a one-can heat-curable resin composition comprising: (1) a polyester polyol having at least three functional groups (2) an adduct of an epoxy resin having at least one secondary hydroxyl group with a lactone compound or an alkylene oxide; and (3) a blocked organic polyisocyanate or a product of blocking of a prepolymer having terminal NCO groups obtained by reacting an organic polyisocyanate and an active hydrogen-containing compound; and curing said composition with heating.

The component (1) to be used in accordance with the invention, namely the polyester polyol having at least three functional groups, can be prepared by esterifying a dicarboxylic acid with a glycol and a polyol having at least three OH groups.

The dicarboxylic acid to be used in the production of said polyester polyol is, for example, an aliphatic one, such as succinic acid, succinic anhydride, adipic acid, azelaic acid, sebacic acid, dodecanoic acid, maleic acid, maleic anhydride, fumaric acid, itaconic acid or a dimer acid, or an aromatic and an alicyclic one, such as phthalic acid, phthalic anhydride, isophthalic acid, dimethyl isophthalate, terephthalic acid, dimethyl terephthalate, 2,6-naphthalenedicarboxylic acid, hexahydrophthalic anhydride, tetrahydrophthalic anhydride, dimethyl cyclohexanedicarboxylate, methylhexahydrophthalic anhydride, 3,6-endo-methyene-1,2,3,6-tetrahydro-cis-phthalic anhydride or methyl-3,6-endo-methylene-1,2,3,6-tetrahydro-cis-phthalic anhydride.

As the glycol, there may be mentioned aliphatic ones, such as ethylene glycol, diethylene glycol, propylene glycol, 1,3-butylene glycol, 1,4-butylene glycol, dipropylene glycol, 1,5-pentanediol, 1,6-hexanediol, neopentyl glycol, neopentyl glycol ester of hydroxypivalic acid, triethylene glycol, 1,9-nonanediol, 3-methyl-1,5-pentanediol, 2,2,4-trimethyl-1,3-pentanediol, 2-ethyl-1,3-hexanediol, polycaprolactone diol, polypropylene glycol, polytetramethylene ether glycol, polycarbonate diol, 2-n-butyl-2-ethyl-1,3-propanediol and 2,2-diethyl-1,3-propanediol, and alicyclic and aromatic ones, such as cyclohexanedimethanol, cyclohexanediol, xylylene glycol, bis(hydroxyethyl) terephthalate, 1,4-bis(2-hydroxyethoxy)benzene, hydrogenated bisphenol A, bisphenol A-ethylene oxide adduct and bisphenol A-propylene oxide adduct.

As the polyol having at least three OH groups, there may be mentioned, for example, glycerin, trimethylolpropane, trimethylolethane, 1,2,6-hexanetriol, pentaerythritol, diglycerin, and ethylene oxide adducts, propylene oxide adducts and ε-caprolactone adducts with such polyols as starting materials.

The esterification reaction is conducted in a conventional manner by distilling off the by-product of condensation. However, since the product is multifunctional, gelation may result if the reaction is driven too far. Generally, it is advisable to discontinue the reaction when the acid value has reached a value within the range of 0.1-50, preferably 1-20.

According to a typical example of the production method, a dicarboxylic acid is charged in an amount in excess of the number of moles of the glycol employed and, while nitrogen gas is blown into the mixture, the reaction is allowed to proceed by distilling off the by-product water as a temperature of 180°-260° C. until the acid number reaches an appropriate value to give a polyester having COOH groups at both ends. A polyol having at least three OH groups is then charged in an amount sufficient to convert said polyester to a polyester having terminal OH groups. The reaction is then conducted while distilling off the by-product water in the same manner and, when the acid value has reached a value of 50 or less, preferably within the range of 1-20, the reaction is discontinued.

When a dicarboxylic acid is used in the form of dimethyl ester, the dimethyl ester is charged in excess as compared with the number of moles of the glycol and the by-product methanol is distilled off under the same conditions as mentioned above to give a polyester having methyl ester groups at both ends. Then, a polyol having at least three OH groups is charged and the ester exchange reaction is conducted under the same conditions as mentioned above to give a polyester polyol.

When an acid anhydride is used in combination, a dicarboxylic is first charged in an amount smaller in the number of moles as compared with the glycol used, and the by-product water is distilled off under the same conditions as mentioned above to give a polyester having OH groups at both ends. The dicarboxylic anhydride is then added. Ring opening of said anhydride leads to formation of a polyester having COOH groups at both ends. Then, a polyol having at least three OH groups is charged, and the reaction is performed in the same manner as mentioned above to give a desired polyester polyol.

The polyester polyol to be used in accordance with the invention should preferably have 3-7 functional groups, more preferably 4-6 functional groups, a number average molecular weight of 600-3,500, and a hydroxyl value of 80-460. When the number of functional groups is less than 3, the cured coat film will have a low hardness and poor chemical resistance.

When the number of functional groups exceeds 7, the coat film may have decreased flexibility. When the number-average molecular weight is below 600, the cured coat film will have an obscured luster. When said molecular weight is more then 3,500, the coating composition will become highly viscous, whereby problems may arise with respect to working properties and/or the stain resistance may become worsened. When the hydroxyl value is less than 80, the cured coat film may have poor chemical resistance and stain resistance. When the hydroxyl value exceeds 460, the flexibility of the cured coat film may become decreased.

The adduct of an epoxy resin having at least one secondary hydroxyl group with a lactone compound or an alkylene oxide, namely the component (2), which is another polyol component to be used in accordance with the invention, is, for example, the product obtained by causing, by per se known means, a lactone compound or an alkylene oxide to add to an epoxy resin of the general formula

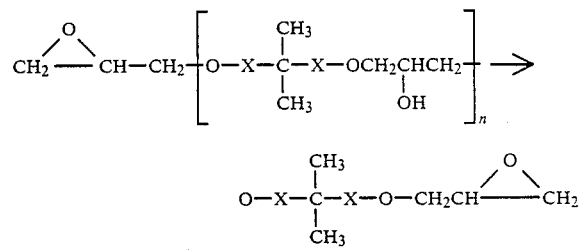

[wherein X is a phenylene or cyclohexylene group, which may optionally be substituted by one or more halogen atoms, and n is 0.5-12.0].

The extent or level of addition of the lactone compound or alkylene oxide is about 5-40 parts by weight relative to about 95-60 parts by weight of said epoxy resin. In particular, those adducts obtained from about 90-70 parts by weight of said epoxy resin and about 10-30 parts by weight of the lactone compound or alkylene oxide are preferred.

Among the epoxy resins having the above general formula, those in which X is p-phenylene and n is 2-9 are preferred. The halogen is, for example, bromine or chlorine. When halo-substituted, the phenylene or cyclohexylene group generally has about 1-3 halogen atoms as substituents at any positions thereof.

As the lactone compound, there may be mentioned, for example β-propiolactone, butyrolactone, ↓-valerolactone, γ-caprolactone, δ-valerolactone, δ-caprolactone, ε-caprolactone, etc. Among them, ε-caprolactone is particularly preferred.

As the alkylene oxide, there may be mentioned, for example, ethylene oxide, propylene oxide, styrene oxide, glycidyl methacrylate, epichlorohydrin, etc. Ethylene oxide is particularly preferred, however.

The adduct of such epoxy resin having at least one secondary hydroxyl group with such lactone compound or alkylene oxide is used in an amount of about 10-70% by weight, preferably within the range of about 10-60% by weight, on the polyol component basis. When said adduct is used in an amount less than 10% by weight on said basis, the stain resistance, in particular the resistance to mustard stain, may be decreased. When it is used in an amount exceeding 70% by weight, the mustard resistance will be satisfactory but the hardness may be markedly decreased.

As the blocked polyisocyanate component to be used in accordance with the invention, there may be mentioned blocked compounds having at least two NCO groups as derived from, for example, aliphatic diisocyanates, such as trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, 2,4,4- or 2,2,4-trimethylhexamethylene diisocyanate, dodecamethylene diisocyanate and 2,6-diisocyanatomethyl caproate, cycloalkylene diisocyanates, such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate, 4,4'-methylenebis(cyclohexyl isocyanate), methyl-2,4-cyclohexane diisocyanate, methyl-2,6-cyclohexane diisocyanate, 1,2-bis(isocyanatomethyl)cyclohexane, 1,4-bis(isocyanatomethyl)cyclohexane, 1,3-bis(isocyanatomethyl)cyclohexane and trans-cyclohexane-1,4-diisocyanate, aromatic diisocyanates, such as m-phenylene diisocyanate, p-phenylene diisocyanate, 4,4'-diphenyl diisocyanate, 1,5-naphthalene diisocyanate, 4,4-diphenylmethane diisocyanate, 2,4- or 2,6-tolylene diisocyanate, 4,4'-toluidine diisocyanate, dianisidine diisocyanate and 4,4'-diphenyl ether diisocyanate, araliphatic diisocyanates, such as ω,ω'-diisocyanato-1,3-dimethylbenzene, ω,ω'-diisocyanato-1,4-dimethylbenzene, ω,ω'-diisocyanato-1,4-diethylbenzene, α,α,α',α'-tetramethyl-m-xylylene diisocyanate and α,α,α',α'-tetramethyl-p-xylylene diisocyanate, triisocyanates, such as triphenylmethane-4,4',4''-triisocyanate, 1,3,5-triisocyanatobenzene, 2,4,6-triisocyanatotoluene and ω-isocyanatoethyl 2,6-diisocyanatocaproate, and tetraisocyanates, such as 4,4'-diphenyldimethylmethane-2,2',5,5'-tetraisocyanate, as well as blocked prepolymers derived from prepolymers having terminal NCO groups as obtained by reacting such polyisocyanates as mentioned above with an active hydrogen-containing compound.

Since precoated metal is required to have weather resistance, the use is preferred of hexamethylene diisocyanate, 3-isocyanatomethyl-3,5,5-trimethylcyclohexyl isocyanate, 1,4-bis(isocyanatomethyl)cyclohexane, 1,3-bis(isocyanatomethyl)cyclohexane, 4,4'-methylenebis(cyclohexyl isocyanate), α,α,α',α'-tetramethyl-m-xylylene diisocyanate and the like isocyanate compounds among the NCO-containing compounds mentioned above.

The prepolymer having terminal NCO groups is prepared by reacting the above-mentioned monomeric isocyanate compound with an active hydrogen-containing compound under conditions such that the isocyanate group is in excess.

The active hydrogen-containing compound to be used in producing said prepolymer includes low-molecular-weight polyols, for example dihydric alcohols, such as ethylene glycol, propylene glycol, 1,2-butylene glycol, 1,3-butylene glycol, 1,6-hexanediol, diethylene glycol, dipropylene glycol, neopentyl glycol, neopentyl glycol ester of hydroxypivalic acid, triethylene glycol, hydrogenated bisphenol A, xylylene glycol and 1,4-butylene glycol, trihydric alcohols, such as glycerin, trimethylolethane, trimethylolpropane and 1,2,6-hexanetriol, and tetrahydric alcohols, such as pentaerythritol, and high-molecular weight polyols, for example polyether polyols, such as propylene oxide or ethylene oxide adducts of the above-mentioned low-molecular-weight polyols, polyester polyols prepared by reacting said low-molecular-weight polyols with dicarboxylic acids, and fatty acid modifications of such polyester polyols.

These polyols may be used either singly or in combination.

The prepolymer formation reaction is generally carried out in an NCO/OH equivalent ratio of about 2.0-15, preferably about 4-8, at 40°-140° C., preferably 70°-100° C. If necessary, the unreacted monomeric isocyanate can then be removed by a conventional method, for example by film evaporation or extraction. Organic metal catalysts, such as tin-, lead-, zinc- and iron-based ones, may be used for said reaction. As the prepolymer, there may be mentioned biuret compounds obtained by reacting water or a low molecular amine, such as ethylenediamine, with an excess of the above-mentioned monomeric isocyanate, allophanate compounds obtained by reacting the above-mentioned low-molecular-weight or high-molecular-weight polyol with an excess of the monomeric isocyanate and, further, organic diisocyanate dimers and trimers obtained by subjecting a monomeric diisocyanate to reaction in the presence of a catalyst known as capable of catalyzing the dimerization or trimerization of organic diisocyanates.

The blocked monomeric isocyanate or blocked prepolymer mentioned above can be prepared by reacting the corresponding monomeric isocyanate or prepolymer with a blocking agent by a conventional method. The blocking agent for use in this reaction may be any blocking agent known as usable for blocking isocyanates, for example a phenol, a lactam, an active methylene compound, an alcohol, a mercaptan, an acid amide, an imide, an amine, an imidazole, a urea, a carbamate, an imine, an oxime or a sulfite. The use of a phenol, an oxime, a lactam, an imine or the like blocking agent, among others, is advantageous. Typical examples of the blocking agent are as follows:

Phenols:
Phenol, cresol, xylenol, nitrophenol, chlorophenol, ethylphenol, p-hydroxydiphenyl, tert-butylphenol, o-isopropylphenol, o-sec-butylphenol, p-nonylphenol, p-tert-octylphenol, hydroxybenzoic acid, hydroxybenzoic acid esters, etc.;

Lactams:
ε-Caprolactam, δ-valerolactam, γ-butyrolactam, β-propiolactam, etc.;

Active methylene compounds:
Diethyl malonate, dimethyl malonate, ethyl acetoacetate, methyl acetoacetate, acetylacetone, etc.;

Alcohols:
Methanol, ethanol, n-propyl alcohol, isopropyl alcohol, n-butyl alcohol, isobutyl alcohol, tert-butyl alcohol, n-amyl alcohol, tert-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, benzyl alcohol, methoxymethanol, glycolic acid, methyl glycolate, ethyl glycolate, butyl glycolate, other glycolates, lactic acid, methyl lactate, ethyl lactate, butyl lactate, other lactic acid esters, methylolurea, methylolmelamine, diacetone alcohol, ethylene chlorohydrin, ethylene bromohydrin, 1,3-dichloro-2-propanol, ω-hydroperfluoroalcohol, acetone cyanohydrin, etc.;

Mercaptans;
Butyl mercaptan, hexyl mercaptan, tert-butyl mercaptan, tert-dodecyl mercaptan, 2-mercaptobenzothiazole, thiophenol, methylthiophenol, ethylthiophenol, etc.;

Acid amides:
Acetanilide, acetanisidide, acetotoluidide, acrylamide, methacrylamide, acetamide, stearic acid amide, benzamide, etc.;
Imides:
Succinimide, phthalimide, maleimide, etc.;
Amines:
Diphenylamine, phenylnaphthylamine, xylidine, N-phenylxylidine, carbazole, aniline, naphthylamine, butylamine, dibutylamine, butylphenylamine, etc.;
Imidazoles:
Imidazole, 2-ethylimidazole, etc.;
Ureas:
Urea, thiourea, ethyleneurea, ethylenethiourea, 1,3-diphenylurea, etc.;
Carbamates:
Phenyl N-phenylcarbamate, 2-oxazolidone, etc.;
Imines:
Ethylenimine, propylenimine, etc.;
Oximes:
Formamidoxime, acetaldoxime, acetoxime, methyl ethyl ketoxime, diacetyl monoxime, benzophenone oxime, cyclohexanone oxime, etc.;
Sulfites:
Sodium bisulfite, potassium bisulfite, etc.

According to a typical method of reacting the above-mentioned monomeric isocyanate or a prepolymer therefrom with the blocking agent, the monomeric isocyanate or prepolymer is reacted with the blocking agent in an equivalent ratio between the NCO group and the active hydrogen in the blocking agent of about 0.9–1.0, preferably about 0.95–1.0; or the monomeric isocyanate is reacted with the blocking agent in an equivalent ratio between the NCO group and the active hydrogen in the blocking agent of about 1.1–3.0, preferably about 1.2–2.0. and the reaction product is further reacted with a low-molecular-weight or high-molecular-weight polyol such as mentioned above in relation to prepolymer production, water or a low molecular amine; or the monomeric isocyanate is reacted with a low-molecular-weight or high-molecular-weight polyol, water or a low molecular amine in an NCO group/active hydrogen equivalent ratio of about 1.5–10.0, preferably about 2.0–7.0, and the reaction product is then reacted with the blocking agent.

In each case, the reaction is carried out by a known method in the absence or presence of a solvent having no active hydrogen atoms (e.g. an aromatic solvent, such as benzene, toluene and xylene, a petroleum solvent, such as Solvesso 100 or Solvesso 200, an ester, such as ethyl acetate or butyl acetate, a ketone, such as acetone, methyl ethyl ketone, methyl isobutyl ketone or cyclohexanone, an ether, such as tetrahydrofuran). In carrying out the reaction, a known catalyst, such as a tertiary amine or an organometallic, may be used.

The one-can heat-curable resin composition according to the invention contains the above-mentioned polyols (1) and (2) and the blocked product (3).

The ratio between the polyols and the blocked product is preferably about ½ to 2/1, more preferably about 1/0.8 to 1/1.2, in terms of the OH group/regenerable NCO group equivalent ratio.

The composition of the invention may be used as it is as a clear coating material or an adhesive, for instance. The composition may further contain, as necessary, other components than the above-mentioned polyols and blocked material, for example an organic solvent, such as an ester (e.g. ethyl acetate, butyl acetate, methyl acetoacetate, 2-ethoxyethyl acetate), an aromatic (e.g. xylene, toluene), a ketone (e.g. methyl ethyl ketone, methyl isobutyl ketone, cyclohexanone), an ether (e.g. diethylene glycol dimethyl ether) or a petroleum solvent (e.g. Solvesso 100, Solvesso 200,), a color pigment, an extender pigment, a dispersing agent of the silicone, amine, polyether, polyester, castor oil, synthetic wax or bentonite type, for instance, a defoaming agent, a leveling agent, a thixotropic agent, a stabilizer of the benzotriazole, hindered amine or hindered phenol type, for instance, and a reaction catalyst, such as a tin-, lead-, zinc- or iron-based one.

The one-can heat-curable resin composition of this invention as obtained in the above manner, when applied to a substrate and then heated, gives a cured coat film as a result of NCO group regeneration due to dissociative elimination of the blocking agent from the blocked product, followed by reaction of the regenerated NCO groups with the OH groups in the polyols.

The resin composition according to the invention is advantageously used in the production of precoated metal in particular, although it is also usable as a coating material or an adhesive.

Generally, the metal sheets to be used in the production of precoated metal may be of any kind suited for precoated metal production, for example cold-rolled steel sheets, galvanized steel sheets, galvanized alloy steel sheets, tinned steel sheets, chrome-plated steel sheets, aluminum-plated steel sheets, lead-plated steel sheets, nickel-plated steel sheets, aluminum sheets, titanium sheets and stainless steel sheets. The resin composition according to the invention is applied to these sheets either directly or after ordinary pretreatment of said sheets. In each case, the resin composition of the invention can be applied to the sheets after application of a primer, as necessary, with or without the subsequent drying of the primer. The pretreatment is, for example, chromating, phosphating, or composite oxide coat layer formation treatment. The chromating treatment includes electric chromating, chromate coating, and reactive chromating treatment. The phosphating treatment includes zinc phosphate treatment and iron phosphate treatment. The composite oxide coat formation treatment includes nickel- and cobalt-containing oxide formation.

The primer may be a conventional one, for example of the epoxy resin or macromolecular polyester type.

The metal sheets may have any form, for example a flat sheet or cylindrical form. The resin composition of the present invention is applied to these metal sheets. The spread or coating amount is not critical but may be optional. However, the film thickness after drying should preferably be 10–30 micrometers.

As the means of application, there may be mentioned a spray gun, a roller coater and a flow coater, among others.

The coated metal sheets are then heated for curing.

The heating temperature may vary depending on the kind of blocking agent and other factors but generally is about 150°–350° C. The heating time is preferably about 20–120 seconds. This heating operation results in dissociative elimination of the blocking agent from the blocked product to regenerate the NCO groups, followed by crosslinking reaction of the regenerated NCO groups with the OH groups of the polyols to give a tough and durable coat film. The coat film obtained by curing the one-can heat-curable resin composition according to the invention shows no yellowing or thermal degradation due to heating at all. Furthermore, said film has a high hardness and is excellent in processability and staining resistance, particularly in mustard staining resistance. In particular, the composition of the invention, when used in the production of precoated metal, gives good coated steel sheets, which can be advantageously used in manufacturing household electric appliances and so on.

The following reference examples and working examples illustrate the invention in further detail. In the examples. "part(s)" or "%" means "part(s) by weight" or "% by weight", respectively.

PRODUCTION OF POLYOLS

Reference Example 1

A reaction vessel was charged with 364.9 g. (1.52 moles) of hydrogenated bisphenol A and 441.6 g. (3.02 moles) of adipic acid, and the reaction was allowed to proceed with heating at 220° C. while nitrogen gas was blown into the vessel and the water resulting from the condensation reaction was distilled off. When an acid value of 250.0 was attained, 304.1 g. (2.27 moles) of trimethylolpropane (hereinafter referred to as "TMP") was added. The reaction was allowed to proceed in the same manner while the condensation water was distilled off. A polyester polyol having five functional groups, with an acid value of 2.6, a hydroxyl value of 187.2 and a number-average molecular weight of 1,478, was thus obtained. In 1,500 g. of cyclohexane were dissolved 600 g. of said polyester polyol and 400 g. of an adduct [Placcel G-402 (Daicel Chemical Industries); hydroxyl value 119, epoxy equivalent 1,250] between an epoxy resin of the formula given below and ε-caprolactone in a ratio of 80:20 by weight to give a solution with a solid content of 40%. Some characteristics of this solution are shown in Table 1.

Reference Example 2

The polyester polyol (800 g.) obtained in Reference Example 1 and 200 g. of an adduct [Placcel G-702 (Daicel Chemical Industries); hydroxyl value 140, epoxy equivalent 2,710] between an epoxy resin of the formula shown below and ε-caprolactone in a ratio of 80:20 by weight were dissolved in 1,500 g. of cyclohexanone to give a solution having a solid content of 40%. Some characteristics of this solution are shown in Table 1.

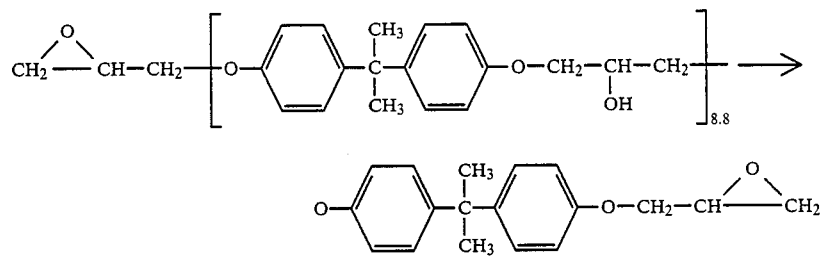

Reference Example 3

A reaction vessel was charged with 205.8 g. (1.74 moles) of 1,6-hexanediol, 670.1 g. (3.45 moles) of dimethyl isophthalate and 0.1 g of zinc acetate, and the reaction was allowed to proceed with heating at 220° C. while nitrogen gas was blown into the vessel and the by-product methanol was distilled off. After removal of 121 ml of methanol, 347.2 g. (2.59 moles) of TMP was added, and the reaction was allowed to proceed in the same manner while the by-product methanol was distilled off. Thus was obtained a polyester polyol having five functional groups, with an acid value of 1.4, a hydroxyl value of 193.6 and a number-average molecular weight of 1,438. This polyester polyol (600 g.) and 400 g. of Placcel G-402 (the same adduct as used in Reference Example 1) were dissolved in 1,500 g. of cyclohexanone to give a solution having a solid content of 40%. Some characteristics of this solution are shown in Table 1.

Reference Example 4

A reaction vessel was charged with 245.3 g. (2.08 moles) of 3-methyl-1,5-pentanediol and 541.6 g. (3.71 moles) of adipic acid, and the reaction was allowed to proceed with heating at 220° C. while nitrogen gas was blown into the vessel and the condensation water was distilled off. When an acid value of 280.0 was attained, 372.9 g. (2.78 moles) of TMP and 0.1 g. of dibutyltin dilaurate were added, and the reaction was allowed to proceed in the same manner while the condensation water was distilled off. Thus was obtained a polyester polyol having five functional groups with an acid value of 1.6, a hydroxyl value of 216.0 and a number-average molecular weight of 1,289. This polyester polyol (800 g.) and 200 g. of Placcel G-402 (the same adduct as used in Reference Example 1) were dissolved in 1,500 g. of cyclohexanone to give a solution having a solid content of 40%. Some characteristics of this solution are shown in Table 1.

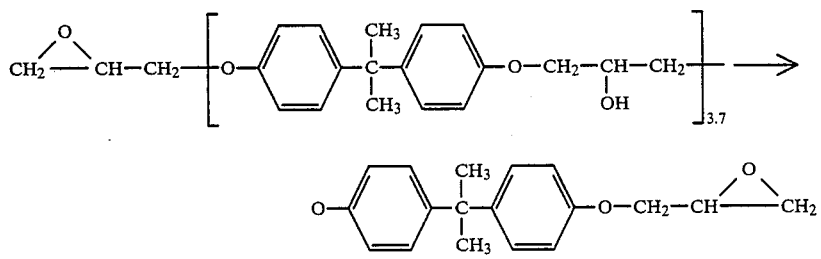

Reference Example 5

A reaction vessel was charged with 151.8 g. (2.45 moles) of ethylene glycol and 550.0 g. (4.66 moles) of succinic acid. The reaction was allowed to proceed under the same conditions as used in Reference Example 1. When an acid value of 420.0 was attained, 159.3 g. (1.17 moles) of pentaerythritol was added. The esterification reaction was continued and, when the acid value became 165.0, 159.3 g. (1.17 moles) of pentaerythritol and 157.0 g. (1.17 moles) of TMP were added. The condensation water was further distilled off to give a polyester polyol having 7 functional groups with an acid value of 3.8, a hydroxyl value of 447.8 and a number average molecular weight of 870. The polyester polyol (800 g.) and 200 g. of Placcel G-402 (the same adduct as used in Reference Example 1) were dissolved in 1,500 g. of cyclohexanone to give a solution with a solid content of 40%. Some characteristics of this solution are shown in Table 1.

Reference Example 6

A reaction vessel was charged with 325.9 g. (1.28 moles) of bis(hydroxyethyl) terephthalate and 513.8 g.(2.54 moles) of sebacic acid, and the reaction was allowed to proceed under the same conditions as used in Reference Example 1. When an acid value of 184.4 was attained, 256.7 g.(1.91 moles) of TMP was added. The condensation water was distilled off continuedly to give a polyester polyol having five functional groups with an acid value of 8.0, a hydroxyl value of 168.3 and a number-average molecular weight of 1,591. This polyester polyol (800 g.) and 200 g. of Placcel G-402 (the same adduct as used in Reference Example 1) were dissolved in 1,500 g. of cyclohexanone to give a solution with a solid content of 40%. Some characteristics of this solution are shown in Table 1.

Reference Example 7

A reaction vessel was charged with 183.4 g. (2.95 moles) of ethylene glycol and 664.7 g.(5.63 moles) of succinic acid, and the reaction was allowed to proceed under the same conditions as used in Reference Example 1. When an acid value of 420.0 was obtained, 189.4 g.(1.41 moles) of TMP was added. The esterification reaction was allowed to proceed continuedly and, when an acid value of 170.0 was attained, 183.4 g.(2.95 moles) of ethylene glycol was further added. Removal of the condensation water by distillation was continued to give a polyester polyol having three functional groups with an acid value of 1.5, a hydroxyl value of 215.5 and a number-average molecular weight of 776. This polyester polyol (800 g.) and 200 g. of Placcel G-702 (the same adduct as used in Reference Example 2) were dissolved in 1,500 g. of cyclohexanone to give a solution having a solid content of 40%. Some characteristics of this solution are shown in Table 1.

PRODUCTION OF BLOCKED MATERIALS

Reference Example 8

1,3-Bis(isocyanatomethyl)cyclohexane (241.6 g.) was dissolved in 400.0 g. of Solvesso 100. Thereto was added 180.6 g. of methyl ethyl ketoxime dropwise over 1 hour. After completion of the dropping, the resultant mixture was heated at 75°–80° C. for 1 hour. Then, 0.6 g. of dibutyltin dilaurate and 177.0 g. of a polyester polyol (prepared from 876.6 g. of adipic acid, 186.3 g. of ethylene glycol, 201.2 g of TMP and 402.3 g. of dipropylene glycol by a conventional method of condensation; acid value 3.5, hydroxyl value 172.0, solid content 100%) were added, and the reaction was allowed to proceed at 75°–80° C. for 6 hours. Thus was obtained a blocked product solution with a regenerable isocyanato group content of 8.5%, a solid content of 60% and Gardner-Holdt viscosity (25° C.) of G-H. Some characteristics of this solution are shown in Table 2.

Reference Example 9

A 2-liter four-necked flask was charged with 801.2 g. of a solution of TMP-3-isocyanatomethyl-3,5,5-trimethylcyclohexyl isocyanate adduct (Takenate D-140N; Takeda Chemical Industries; solid content 75%, isocyanato content 10.78%; ethyl acetate solution) and 316.1 g. of cellosolve acetate. While the contents were maintained at 60°–70° C. in a nitrogen gas atmosphere, 182.7 g. of methyl ethyl ketoxime was added dropwise slowly. After completion of the dropping, the above temperature was maintained for about 4 hours to give a blocked product solution with a solid content of 60% and a regenerable isocyanato group content of 6.64%. Some characteristics of this solution are shown in Table 2.

Reference Example 10

$\omega,\omega'$,-Diisocyanato-1,3-dimethylbenzene (307.5 g.) was dissolved in 519.1 g. of Solvesso 100 and 129.7 g. of methyl ethyl ketone. To the solution was added dropwise over about 2 hours 237.2 g. of methyl ethyl ketoxime. After completion of the dropping, the mixture was heated at 75°–80° C. for 1 hour. Then, 0.3 g. of dibutyltin dilaurate and 232.4 g. of the same polyester polyol as used in Reference Example 8 were added, and the reaction was allowed to proceed at 75°–80° C. for 6 hours. Thus was obtained a blocked product solution with a regenerable isocyanato group content of 8.02% and a solid content of 55%. Some characteristics of this solution are shown in Table 2.

Reference Example 11

A 2-liter four-necked flask was charged with 760.7 g. of a solution of TMP-hexamethylene diisocyanate adduct [Takenate D-160N; Takeda Chemical Industries; solid content 75%, isocyanato group content 13.2%, Gardner-Holdt viscosity (25° C.) J-K]and 325.6 g. of cellosolve acetate. While the contents were maintained at 60°–70° C. in a nitrogen gas atmosphere, 213.7 g. of methyl ethyl ketoxime was added dropwise slowly. After completion of the addition, the above temperature was maintained for about 2 hours to give a blocked product solution with a solid content of 60%, a regenerable isocyanato group content of 7.77% and Gardner-Holdt viscosity (25° C.) of Q-R. Some characteristics of this solution are shown in Table 2.

Reference Example 12

4,4'-Methylenebis(cyclohexyl isocyanate) (228.6 g.) was dissolved in 160.0 g. of toluene and 160.0 g. of cyclohexanone. Thereto was added 126.5 g. of methyl ethyl ketoxime dropwise over 1 hour. After completion of the dropping, the mixture was heated at 75°–80° C. for 1 hour. Then, 0.48 g. of 1,1,3,3-tetra-n-butyl-1,3-diacetoxydistannoxane and 123.92 g. of the same polyester polyol as used in Reference Example 8 were added. After the subsequent 8 hours of reaction at 75°–80° C., a blocked product solution was obtained which had a regenerable isocyanato group content of 7.6% and a solid content of 60%. Some characteristics of this solution are shown in Table 2.

Reference Example 13

A 2-liter four-necked flask equipped with a stirrer, a thermometer, a nitrogen gas inlet tube and a reflux condenser was charged with 500 g. of a TMP-α,α, α'-,α'-tetramethyl-m-xylylene diisocyanate adduct (solid at room temperature; isocyanato content 13.3%), 427.1 g. of ethyl acetate and 0.19 g. of 1,1,3,3-tetra-n-butyl-1,3-diacetoxydistannoxane. While the contents were maintained at 60°–70° C. in a nitrogen gas atmosphere, 140.5 g. of methyl ethyl ketoxime was added dropwise slowly. After completion of the addition, the resultant mixture was maintained at the above temperature for about 4 hours to give a blocked product solution with a solid content of 60%, a regenerable isocyanato group content of 6.20% and a Gardner-Holdt viscosity (25° C.) of Q-R. Some characteristics of this solution are shown in Table 2.

ture was kneaded sufficiently by means of a paint conditioner to give a white enamel solution. This solution was applied to a galvanized steel sheet, 0.6 mm in thickness and subjected beforehand to electrolytic chromating treatment, application of an epoxy resin primer to a dry film thickness of 5 micrometers and baking, to a dry film thickness of 20 micrometers with a bar coater and baked in an atmosphere of 260° C. for 60 seconds to give a lustrous white coat film. The composition of the white enamel and some performance characteristics of the coat film are shown in Table 3.

EXAMPLE 2-10

White enamel solutions (each 100 parts in total; PWC=50%) were prepared by using the blocked product solutions obtained in Reference Examples 8–13, respectively, according to the respective formulations shown in Table 3. They were applied to the same steel sheets as used in Example 1 in the same manner as in Example 1 and baked under the same conditions as in Example 1.

TABLE 1

| Polyol | | | Reference Example No. | | | | | | |
|---|---|---|---|---|---|---|---|---|---|
| | | | 1 | 2 | 3 | 4 | 5 | 6 | 7 |
| Polyol composition (%) | Polyester polyol | | 60 | 80 | 60 | 80 | 80 | 80 | 80 |
| | Epoxy resin adduct | Placcel G-402 | 40 | — | 40 | 20 | 20 | 20 | — |
| | | Placcel G-702 | — | 20 | — | — | — | — | 20 |
| Characteristics of solution | Diluent solvent | | Cyclo-hexanone | Cyclo-hexanone | Cyclo-hexanone | Cyclo-hexanone | Cyclo-hexanone | Cyclo-hexanone | Cyclo-hexanone |
| | Nonvolatile matter (%) | | 40 | 40 | 40 | 40 | 40 | 40 | 40 |
| | Acid value | | 0.6 | 0.8 | 0.3 | 0.5 | 1.2 | 2.5 | 0.5 |
| | Hydroxyl value | | 64.0 | 71.1 | 65.5 | 78.6 | 152.8 | 63.4 | 80.2 |
| | Gardner-Holdt viscosity (25° C.) | | F-G | G-H | T-U | B-C | N-O | D-E | A-B |

EXAMPLE 1

A reaction vessel was charged with 43.4 parts of the polyol solution obtained in Reference Example 1 and 24.5 parts of the blocked product solution obtained in Reference Example 8 (NCO/OH equivalent ratio=1.0). Then, 32.1 parts of titanium oxide (Tipaque R-820; Ishihara Sangyo) was added so that the pigment weight concentration (PWC) amounted to 50%. 1,1,3,3-Tetra-n-butyl-1,3-diacetoxydistannoxane (0.024 part) was further added as a catalyst, and the resultant mix-

TABLE 2

| Blocked product | Reference Example No. | | | | | |
|---|---|---|---|---|---|---|
| | 8 | 9 | 10 | 11 | 12 | 13 |
| Characteristics of solution | | | | | | |
| Nonvolatile matter (%) | 60 | 60 | 55 | 60 | 60 | 60 |
| Gardner-Holdt viscosity (25° C.) | G-H | Y | A-1 | Q-R | F-G | Q-R |
| Regenerable isocyanato group content (%) | 8.5 | 6.64 | 8.02 | 7.77 | 7.6 | 6.2 |

TABLE 3

| | Example No. | | | | | | | | | |
|---|---|---|---|---|---|---|---|---|---|---|
| | 1 | 2 | 3 | 4 | 5 | 6 | 7 | 8 | 9 | 10 |
| White enamel composition | | | | | | | | | | |
| Polyol (Reference Example No.) | 1 | 2 | 3 | 4 | 3 | 3 | 3 | 5 | 6 | 7 |
| Amount of polyol (parts) | 43.4 | 41.6 | 43.0 | 35.5 | 42.6 | 41.5 | 41.1 | 26.3 | 38.1 | 37.5 |
| Blocked product (Reference Example No.) | 8 | 8 | 8 | 9 | 10 | 11 | 12 | 12 | 13 | 12 |
| Amount of blocked product (parts) | 24.5 | 26.1 | 24.8 | 31.5 | 26.1 | 26.2 | 26.5 | 39.5 | 29.2 | 29.7 |
| Titanium oxide (parts) | 32.1 | 32.3 | 32.1 | 33.0 | 31.3 | 32.3 | 32.4 | 34.2 | 32.7 | 32.8 |
| 1,1,3,3-Tetra-n-butyl-1,3-diacetoxy-distannoxane (part) | 0.024 | 0.026 | 0.025 | 0.032 | 0.026 | 0.026 | 0.027 | 0.040 | 0.029 | 0.030 |
| Film performance characteristics | | | | | | | | | | |
| Pencil hardness[*1] | | | | | | | | | | |
| Scar method | 2H | 2H | 2H | 2H | 3H | 3H | 2H | 3H | 2H | 2H |
| JIS method | 4H | 4H | 4H | 4H | 4H | 4H | 4H | 5H | 3H | 3H |
| T-bending[*2] (*20° C.) | 5T | 6T | 5T | 6T | 6T | 6T | 6T | 6T | 6T | 2T |
| Staining resistance[*3] | | | | | | | | | | |
| Black marker ink | ⊙ | ⊙ | ⊙ | ⊙ | ⊙-◉ | ⊙ | ⊙ | ⊙ | ⊙ | ⊙ |
| Red marker ink | ○ | ○ | ⊙ | ⊙ | ○ | ⊙ | ⊙-○ | ⊙ | ⊙-○ | ○ |
| Solvent resistance[*4] | | | | | | | | | | |
| Xylene rubbing (50 times) | OK | OK | OK | OK | OK | OK | OK | OK | OK | OK |

TABLE 3-continued

|  | Example No. | | | | | | | | | |
|---|---|---|---|---|---|---|---|---|---|---|
|  | 1 | 2 | 3 | 4 | 5 | 6 | 7 | 8 | 9 | 10 |
| Mustard staining resistance*5 | ⊙ | ○ | ⊙ | ⊙ | ⊙ | ○ | ⊙-○ | ⊙ | ⊙ | ○ |

Evaluation methods
*1Pencil hardness:
Scar method: The coat film surface is scratched with a pencil as described in JIS K 5400, then wiped with absorbent cotton, and observed. The hardness is expressed in terms of the hardness of the hardest pencil incapable of giving scars.
JIS method: According to JIS K 5400.
*2T-bending: The precoated metal specimen is folded back to an angle of 180° under a pressure of 50 KgG/cm$^2$ as applied by a hand press, with interposition of a certain number of iron sheets each having the same thickness as the specimen. The folded portion is then macroscopically observed through a magnifying glass of 30 times. T-bending is expressed in terms of the smallest number of iron sheets with which cracking will not occur.
*3Staining resistance: A line is drawn on the coat film surface in black or red marker ink and, after 24 hours of standing, wiped off with absorbent cotton impregnated with ethanol. The trace of the marker ink line is evaluated according to the following criteria:
⊙: No trace;
○ : Vague trace;
Δ: Slight trace;
X: Distinct trace.
*4Solvent resistance: The coat film surface is rubbed with a xylene-impregnated cloth under a constant load. One reciprocation of the cloth is counted as one rubbing. The solvent resistance is evaluated depending on whether 50 rubbings result in coat film surface damage.
*5Mustard staining resistance: A commercially available mustard paste (60 parts) is dispersed thoroughly in 100 parts of water. The precoated metal sheet specimen is immersed in this dispersion at room temperature. After 24 hours of immersion, the specimen is taken out, washed well with water and observed by the eye.
⊙: No yellow staining;
○ : Indistinct yellow staining;
Δ: Slight yellow staining;
X: Distinct yellow staining.

What is claimed is:
1. A precoated metal obtained by coating a metal sheet with a one-can heat-curable resin composition comprising: (1) a polyester polyol having at least three functional groups; (2) an adduct of an epoxy resin having at least one secondary hydroxyl group with a lactone compound or an alkylene oxide; and (3) a blocked organic polyisocyanate or a product of blocking of a prepolymer having terminal NCO groups obtained by reacting an organic polyisocyanate and an active hydrogen-containing compound; and curing said composition with heating.

2. A precoated metal claimed in claim 1, wherein the polyester polyol (1) is one obtained by the reaction of dimethyl isophthalate, 1,6-hexane diol and trimethylolpropane and the adduct of an epoxy resin (2) is one obtained by the reaction of an epoxy resin with ε-caprolactone and the blocked product (3) is one obtained by the reaction of 4,4'-methylene bis (cyclohexyl isocyanate), trimethylolpropane and methyl ethyl ketoxime.

3. A precoated metal claimed in claim, 1, wherein the heating temperature is about 150° to 350° C. and the heating time is about 20 to 120 seconds.

4. A one-can heat-curable resin composition which comprises: (1) a polyester polyol having at least three functional groups; (2) an adduct of an epoxy resin having at least one secondary hydroxyl group with a lactone compound or an alkylene oxide; and (3) a blocked organic polyisocyanate or a product of blocking of a prepolymer having terminal NCO groups obtained by reacting an organic polyisocyanate and an active hydrogen-containing compound.

5. A one-can heat-curable resin composition claimed in claim 4, wherein the polyester polyol (1) is one obtained by the reaction of dimethyl isophthalate, 1,6-hexane diol and trimethylolpropane and the adduct of an epoxy resin (2) is one obtained by the reaction of an epoxy resin with ε-caprolactone and the blocked product (3) is one obtained by the reaction of 4,4'-methylene bis (cyclohexyl isocyanate), trimethylolpropane and methyl ethyl ketoxime.

* * * * *